3,045,050
METHOD OF PRODUCING AROMATIC SULPHONES

Cornelis Johannes Schoot, Klaas Hinderikus Klaassens, and Johannes Jacobus Ponjee, Eindhoven, Netherlands, assignors to North American Philips Company, Inc., New York, N.Y., a corporation of Delaware
No Drawing. Filed July 30, 1958, Ser. No. 751,885
Claims priority, application Netherlands Aug. 14, 1957
10 Claims. (Cl. 260—607)

This invention relates to a method of producing aromatic sulphones, characterized in that an aromatic compound RH or R'H or a mixture of these compounds, where R and R' can be equal or different and both represent a benzene, naphthalene or thiophen nucleus which carries at least one hydrocarbon radical or at least one ether or thioether group, or a non-substituted thiophen nucleus, is heated in the presence of a halide of ortho-, meta- or pyrophosphoric acid or a mixture of these acids and a metal salt of sulphuric acid, with the exception of the salts of the alkaline earth and alkaline metals.

In the sulphones produced by this method sulphur is directly bound to the aromatic nuclei.

This is illustrated by the following equation, which can represent the reaction when the aromatic compound RH is heated in the presence of silver sulphate and phosphorus oxychloride:

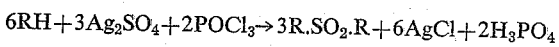

Suitable aromatic compounds are compounds according to the formula RH, where R represents a benzene, naphthalene or thiophen nucleus carrying at least one, more particularly 1 to 3 hydrocarbon radicals, which can be an alkyl, aralkyl or aryl group, for example a methyl, benzyl or phenyl group. Especially good results are obtained with benzene derivatives. It was found that suitable substituents are alkyl groups having 1 to 18 carbon atoms each, for example a hexyl, octyl or decyl group, more particularly groups having 1 to 5 carbon atoms each, such as, for example, an ethyl, propyl, isopropyl, butyl or tertiary butyl group, and preferably a methyl group. Further suitable materials are benzene and naphthalene derivatives having at least one, more particularly 1 to 3 and preferably one ether or thio-ether group, which may be either an alkoxy, aralkoxy or aryloxy group or the corresponding thio-ether group, as substituents in the nucleus. Especially good results are obtained with benzene derivatives containing an alkoxy group having from 1 to 5 carbon atoms, for example an ethoxy, propoxy or butoxy group, and preferably a methoxy group, in the nucleus. Monomethoxy benzene is particularly suitable.

Furthermore the method in accordance with the invention is of particular importance for the production of sulphones of compounds according to the formula RH, where R represents a thiophen nucleus which may be substituted, provided that neither the nucleus nor the substituents contain free hydroxyl, sulphydryl or amino groups. Suitable substituents in the thiophen nucleus are particularly alkyl groups, more particularly groups having 1 to 18 carbon atoms each, for example, a hexyl, octyl or decyl group, and preferably groups having 1 to 5 carbon atoms each, for example, an ethyl, propyl, isopropyl, butyl or tertiary butyl group, and especially a methyl group, and furthermore aliphatic ether or thio-ether groups, particularly groups having 1 to 5 carbon atoms each and preferably groups having 1 carbon atom each. Thiocoumarone is also suitable.

A known method of producing aromatic and mixed aliphatic-aromatic sulphones is that according to Friedel-Crafts, in which an aromatic or aliphatic sulphohalide is reacted in the presence of a condensation agent, for example aluminum chloride. However, this method is not very suitable for the production of ketones or compounds which contain an aliphatic or cyclic ether or thio-ether group. In these compounds, generally the ether or thio-ether bond will be split as a secondary reaction by the action of the condensation agent, in the method in accordance with the invention this disadvantage does not occur, ether and thio-ether bonds are substantially not attacked.

Suitable metal salts of sulfuric acid are the salts of the metals of the subgroups of the periods IV, V and VI and of the group VIII of the periodic table of the elements and the salts of manganese, and particularly the salts of the group comprising silver, zinc, cadmium, copper, mercury, tin and lead. The reaction proceeds smoothly and completely with the use of salts of the metals silver, zinc or cadmium and especially the salts of silver.

As is well known, there are several halides of the above-mentioned phosphoric acids. This is due on the one hand to the fact that one or more hydroxyl groups can be replaced by halogen atoms while on the other hand in producing a halide of one of the said phosphoric acids generally a mixture is obtained the exact composition of which cannot readily be ascertained. It has been found that these mixtures can be used to advantage. However, in practice those halides are preferred in which all the hydroxyl groups are replaced by halogen atoms.

A suitable halide is the acid chloride, more particularly phosphorus oxychloride.

In the method according to Friedel-Crafts the initial materials are sulphohalides. These compounds must be previously produced separately. In contradistinction thereto, in the method in accordance with the invention the initial materials are aromatic compounds which do not contain the sulphohalide group. This is a special advantage of the present method which thus has an attractive simplicity. A further advantage consists in that this method is particularly suited for the production of symmetric sulphones. For this purpose one aromatic compound is chosen as the initial material. However, the present method also enables mixed sulphones to be produced. For this purpose the initial material must be a mixture of two different aromatic compounds RH and R'H.

In the present method a heterogeneous reaction is involved since the metal salt is present in the solid state. A rapid and complete conversion requires the use of the metal salt as a fine powder.

The reaction should be performed under substantially anhydrous conditions. This implies that the reactants must be entirely or substantially anhydrous so that from metal salts which contain water of crystallization, this water must previously be removed entirely or substantially entirely. This can be effected by heating, preferably at a reduced pressure. Since the crystallized silver sulphates contain no water of crystallization, these salts are to be preferred for this reason also.

In addition it was surprising to find that for the reaction to proceed smoothly and completely the reaction mixture must contain a slight amount of water. As long as the reaction mixture is completely dry, no reaction is initiated. This may be shown by first working under completely dry conditions and then adding a few drops of water. Generally it can then be observed that heat generation occurs only after the addition of water owing to the reaction being initiated.

Alternatively the reaction can be performed in the presence of a diluent which is a solvent for the aromatic compound RH. As inert diluents use can be made of aliphatic hydrocarbons, such as benzene, aromatic hydrocarbons, such as chlorobenzene and nitrobenzene, aliphatic ethers, for example dibutyl ether, and aliphatic esters, such as butyl acetate. It has also been found that the use of a nitro-alkane as the diluent increases the yield. Hence very suitable diluents are nitromethane and nitropropane.

Alternatively, an excess of the aromatic compound RH can be used as a diluent.

In the present method monosulphones are produced substantially only. Disulphones are not or substantially not produced. It has been found that this production of monosulphones does not depend upon the proportions of the amounts of the reactants. Even if too slight an amount of the aromatic compound RH is used, monosulphones are produced substantially only.

The reaction is preferably performed at an elevated temperature of between 80° C. and 180° C., preferably between 100° C. and 150° C.

The sulphones to be produced by the method according to the invention can be used for a variety of purposes. Certain sulphones may, for example, be used as initial materials for syntheses, as solvents or diluents, as softeners, in dielectrics and insulating material, as tanning materials, as antibiotics, as basic materials for the production of dyestuffs, as bactericides and as therapeutic agents.

The invention will now be illustrated by the following examples.

*Example I.—4,4'-Dimethoxydiphenylsulphone*

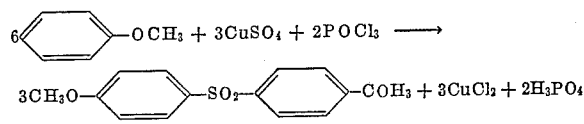

In a flask of capacity 150 ccs., which are equipped with a reflux cooler provided with a tube containing calcium chloride, 0.5 cc. of water was added to 10.2 gms. (0.067 mole) of phosphorus oxychloride and 42 gms. of methoxy benzene. Subsequently the mixture was boiled under reflux by heating on an oil bath for 2 hours. After completion of the reaction the aggregate was subjected to a distillation with the aid of steam. The excess of methoxy benzene distilled over. After the distillation residue had been cooled, the precipitate produced was filtered off. The precipitate was removed from the filter and boiled with 100 ccs. of 2 N nitric acid for one hour. Thus the copper salts contained in the precipitate were dissolved. After cooling the crude 4,4'-dimethoxy-diphenyl sulphone was filtered off. Yield: 11 gms.= 40%. After crystallization from ethanol the melting point was: 126° C. Mixed melting point 126° C.

*Example II.—4,4'-Dichloro-Diphenylsulphone*

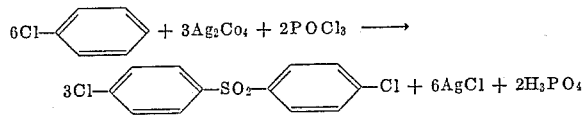

In a flask provided with a reflux cooler and a tube containing calcium chloride there were mixed 15.6 gms. (0.05 mole) of silver sulphate, 5.1 gms. (0.033 mole) of phosphorus oxychloride, 25 gms. of chloro-benzene and 0.5 cc. of water. The mixture was heated to a boiling temperature for 2 hours. After the reaction mixture had been cooled, the separated silver chloride was filtered off and extracted with hot benzene. The filtrate and the extracts were together subjected to a distillation with the aid of steam. The benzene and the excess chlorobenzene distilled over. After cooling the distillation residue was filtered, 3.5 gms. of crude 4,4'-dichloro-diphenyl sulphone being retained on the filter.

Yield of crude product: 25%.

After crystallization from a mixture of alcohol and water, the melting point was 145° C. Literature: 146° C.

*Example III.—4,4'-Dimethoxy-Diphenylsulphone*

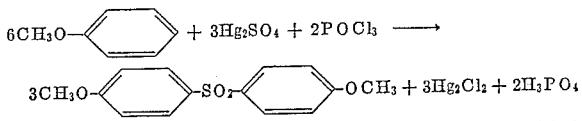

In a flask of capacity 200 ccs., which was provided with a reflux cooler and a tube containing calcium chloride, a mixture of 49.7 gms. (0.1 mole) of substantially anhydrous mercuro-sulphate, 10.2 gms. (0.067 mole) of phosphorous oxy-chloride and 42 gms. of methoxy benzene were heated on a water bath for 2 hours. Subsequently the mixture was heated to 150° C. on an oil bath for 2 hours. Then the reaction mixture was subjected to a distillation with the aid of steam in order to remove the excess methoxybenzene. The distillation residue was filtered off and the separated mercury salts were extracted with hot benzene. The filtrate and the extract were dried together over calcium chloride and then filtered, the benzene being distilled off subsequently. Yield of 4,4'-dimethoxy-diphenylsulphone: 11.1 gms.= 40%.

After crystallization from ethanol, the melting point was 126° C.

Mixed melting point: 126° C.

What is claimed is:

1. A method of producing aromatic sulfones of the formula RSO$_2$R wherein R is a member of the group consisting of benzene and naphthalene rings substituted only with from 1–3 radicals selected from the class consisting of alkyl of 1–18 carbon atoms, alkoxy of 1–5 carbon atoms, phenyl, benzyl and chlorine comprising the steps of heating, at a temperature between about 80° C. and 180° C. from 1 to 2 compounds corresponding to the formula RH together with a salt of sulfuric acid and a metal of groups IV, V, VI and VIII of the periodic table and manganese, at least one oxyphosphorus halide selected from the group consisting of the halides of ortho-, meta-, and pyrophosphoric acids in the presence of a trace of water and separating out the resultant aromatic sulfone.

2. The method of claim 1 in which the oxyphosphorus halide is phosphorus oxychloride and the sulfuric acid salt is silver sulfate.

3. The method of claim 2 in which the compound of the formula RH is 1,3-dimethyl benzene.

4. The method of claim 2 in which the compound of the formula RH is 1,3,5-trimethyl benzene.

5. The method of claim 2 in which the compound of the formula RH is methoxy benzene.

6. The method of claim 2 in which the compound of the formula RH is benzene.

7. The method of claim 2 in which the heating is carried out between a temperature of 100° C. to 150° C.

8. The method of claim 7 in which the reaction is carried out in nitromethane.

9. The method of claim 7 in which the reaction is carried out in nitropropane.

10. The method of claim 7 in which the reaction is carried out in an excess of the compound of the formula RH.

References Cited in the file of this patent

FOREIGN PATENTS 990,161    France _____ June 6, 1951

OTHER REFERENCES

Weiss: Deutsche Chemische Gesellschaft (Berichte), vol. 26, page 1699 (1893).

Klosa: Chemical Abstracts, vol. 50, page 15531h (1956).